United States Patent
Kumar (10) Patent No.: US 7,899,397 B2
(45) Date of Patent: Mar. 1, 2011

(54) MOBILE INTERNET DEVICE WITH DETACHABLE WIRELESS MODULE

(76) Inventor: Avi Kumar, Austin, TX (US)

( * ) Notice: Subject to any disclaimer, the term of this patent is extended or adjusted under 35 U.S.C. 154(b) by 476 days.

(21) Appl. No.: 11/945,265

(22) Filed: Nov. 27, 2007

(65) Prior Publication Data

US 2009/0147758 A1     Jun. 11, 2009

(51) Int. Cl.
*H04B 7/00*     (2006.01)

(52) U.S. Cl. .................. 455/41.2; 455/41.1; 455/550.1; 455/553.1; 455/566

(58) Field of Classification Search ................. 455/41.1, 455/41.2, 550.1, 553.1, 556.1, 557, 566, 455/572, 573, 574, 575.1, 100
See application file for complete search history.

(56) References Cited

U.S. PATENT DOCUMENTS

| 6,324,380 | B1 * | 11/2001 | Kiuchi et al. | 455/12.1 |
| 6,952,595 | B2 * | 10/2005 | Ikedo et al. | 455/553.1 |
| 7,574,177 | B2 * | 8/2009 | Tupman et al. | 455/90.3 |

* cited by examiner

*Primary Examiner*—Tuan A Pham
(74) *Attorney, Agent, or Firm*—Nathan H. Calvert (57) ABSTRACT

Mobile computing systems are provided having an ultra-mobile PC and a detachable wireless communications module operable as phone and a short range and long range wireless data link. In one embodiment, the wireless communications module is capable of synchronizing data with the ultra-mobile PC. Another embodiment provides parasitic charging of the wireless communications module from the ultra-mobile PC battery for extended battery life. Another embodiment provides ability to synchronize data to and from the ultra-mobile PC even when it is powered off. Another embodiment provides drag and drop capability between the wireless module screen and the UMPC screen, which may provide application or operating system data transfers.

15 Claims, 9 Drawing Sheets

MOBILE INTERNET DEVICE WITH DETACHABLE WIRELESS MODULE

TECHNICAL FIELD

This invention relates to mobile internet devices, or ultra-mobile PC's, and particularly to mobile internet devices having a detachable wireless communications module that functions as a mobile phone.

BACKGROUND

There is a need for computer systems that are powerful, mobile, and wirelessly connected to the internet. For example, it can be costly to purchase and maintain a laptop computer, and a PDA for pocket-portable information access, and a cellular phone. The combined size and weight of such devices also presents a burden to many business travelers, students, and other individuals who work with digital information and need to stay connected. It can also be burdensome to learn to use many different interfaces. An internet-capable PDA or PDA/phone presents one solution, but it typically frustrates internet use due to small screen size and slow keyboard typing.

A new development in portable computing, the ultra-mobile PC ("UMPC"), provides a solution having power similar to that of a notebook computer, but portability more like that of a PDA. The UMPC screen is typically larger than a PDA screen, measuring around 4-7 inches diagonally. The UMPC is therefore portable in a smaller bag than a notebook computer, or in a large jacket pocket, but not typically in a pants pocket like a PDA or cellular phone. Typical UMPC designs may or may not include a built-in wireless network transceiver. Or, if they do, the UMPC battery life is not sufficient to use the device for the user's mobile phone.

Another need in the portable computer market is the need to store similar data (such as an address book) in several mobile computing devices often requires multiple entries and wasted time. Further, the need to access working files across portable devices and desktop PCs or storage area networks often creates extra tasks for information workers, for example copying files onto portable data drives or logging in to secure networks to remotely access files.

What is needed, therefore, are devices that provide computing power, wireless connectivity, and comparatively large screen size. What is also needed are devices that synchronize a users digital data among various work environments for easy portable access.

SUMMARY

Mobile computing systems are provided having an ultra-mobile PC and a detachable wireless communications module operable as phone and a short range and long range wireless data link. In one embodiment, the wireless communications module is capable of synchronizing data with the ultra-mobile PC. Another embodiment provides parasitic charging of the wireless communications module from the ultra-mobile PC battery for extended battery life. Another embodiment provides ability to synchronize data to and from the ultra-mobile PC even when it is powered off.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
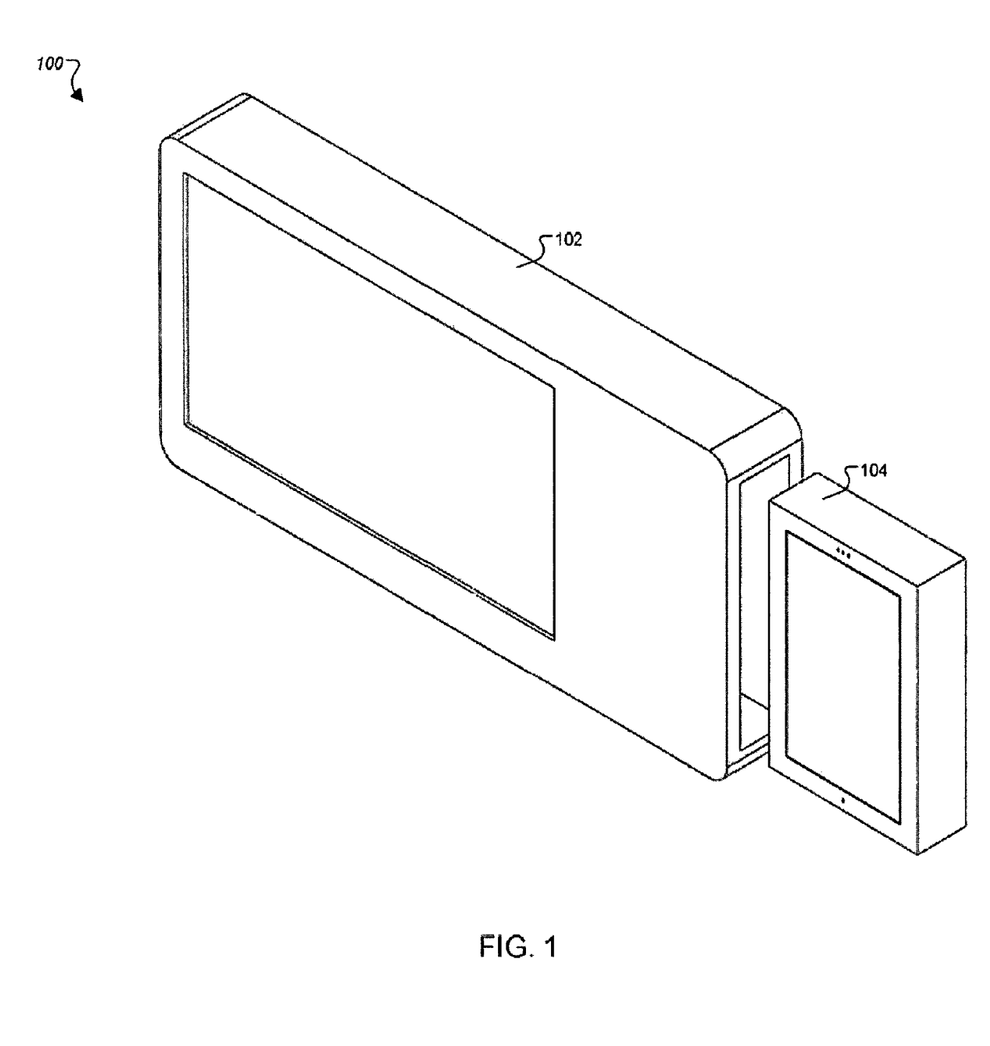
FIG. 1 is a perspective drawing of one example ultra-portable PC and detachable mobile phone module according to one embodiment.

FIG. 1 is a perspective drawing of one example mobile computing system including a mobile internet device and detachable mobile phone module according to one embodiment. In the depicted mobile computing system 100, an ultra-mobile PC (UMPC) 102 is shown with a detachable wireless communication module 104. System 100 provides ultra-mobile computing capability and a long-range wireless connection capability through the wireless communication module 104, which, in the depicted embodiment, is also used as a cellular phone.

Figure 2A:
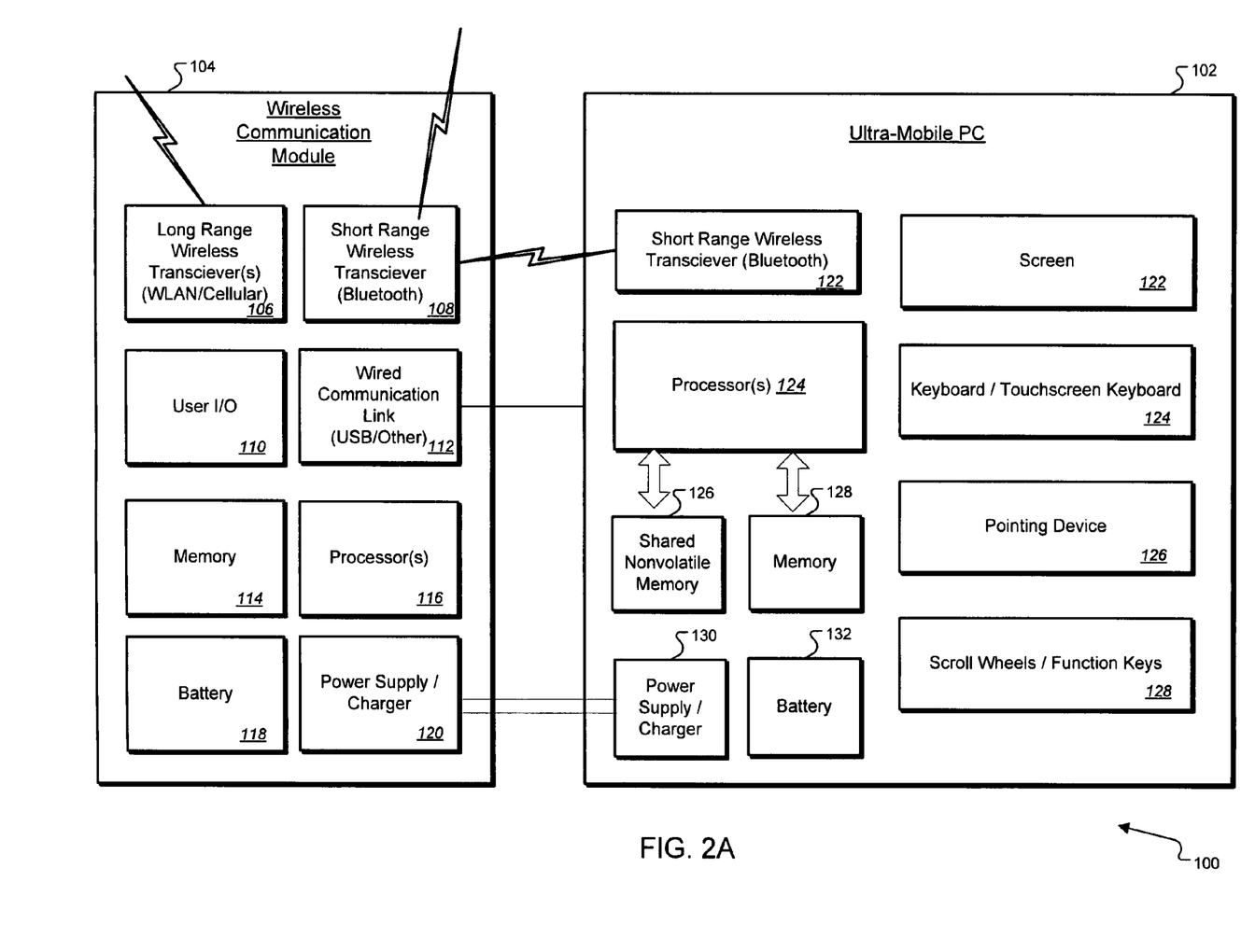
FIG. 2A is a logical block diagram of an ultra-portable PC device and detachable mobile phone according to one embodiment.

FIG. 2 depicts a high-level block diagram of the portable computer system of FIG. 1. With reference to FIG. 1 and FIG. 2, the depicted wireless communication module 104 is preferably designed to resemble a cellular phone, having earpiece, microphone, a keypad (buttons or touchscreen), and a display screen. The module 104 is employed as a cellular phone, or VoIP WLAN phone, when detached from UMPC 102, and may also provide voice or videophone capability when attached. The preferred wireless communications module 104 includes a long range wireless transceiver 106 such as a cellular/3G cellular or Wi-max transceiver. It also includes a short-range wireless transceiver 108, preferably Bluetooth, for communicating with UMPC 102 when not physically attached and other devices such as, for example, a wireless headset.

In one embodiment, wireless module 104 includes a QWERTY keyboard that may also provide keyboard input to UMPC 102 through the Bluetooth, even while physically not attached. This is especially useful when the device has only a touchscreen keyboard and the user wants to maximize screen space or prefers a tactile keyboard. A dedicated switch may be provided to quickly enable this feature.

In use, communication module 104 may resemble a cellular phone or PDA phone, providing voice capability and data access. When used tethered to the UMPC by Bluetooth link 108, the wireless module 104 provides a long distance data link connecting the UMPC to the internet or other digital network. In various embodiments, a hard-wired data connection may also be present when module 104 is attached to UMPC 102. Also, due to the physical attachment or mating between the two, communication module 104 has increased energy storage unit (battery) life provided by parasitic charging from the typically larger energy storage unit of UMPC 102 when physically attached.

The depicted electrical connection between power supply/charger 120 (wireless module) and power supply/charger 130 (UMPC) is made through conductors in the connector when the two devices are attached. In one embodiment, the wired connection is made to the USB bus on the UMPC, preferably through a connector modified to improve the mechanical fit between module 104 and UMPC 102. The USB connection may also provide data connection, although data connection may be provided through the short range wireless link even while the devices are physically attached. The connector needs additional wiring to supply charging power to module 104 when the UMPC is turned off (which turns off the USB voltage supply). This connection may be in parallel on the USB power rail.

To make the phone quickly accessible to answer calls when connected to UMPC 102, should easily accessible in bag or purse, the detachment process is preferably a single-motion or single-button process, operable with one hand. This may be achieved, for example, with a release mechanism operable by squeezing with one hand or combining a single button with a single pulling motion for release.

The preferred screen size for a UMPC can range from that of an ultra-portable laptop to a large PDA-sized display. Such a range is typically around 4 to 7 inches, with a larger 6-7 inch display preferred. The UMPC screen may be a touch screen, depending on the product and whether/what keyboard is present.

Figure 2B:
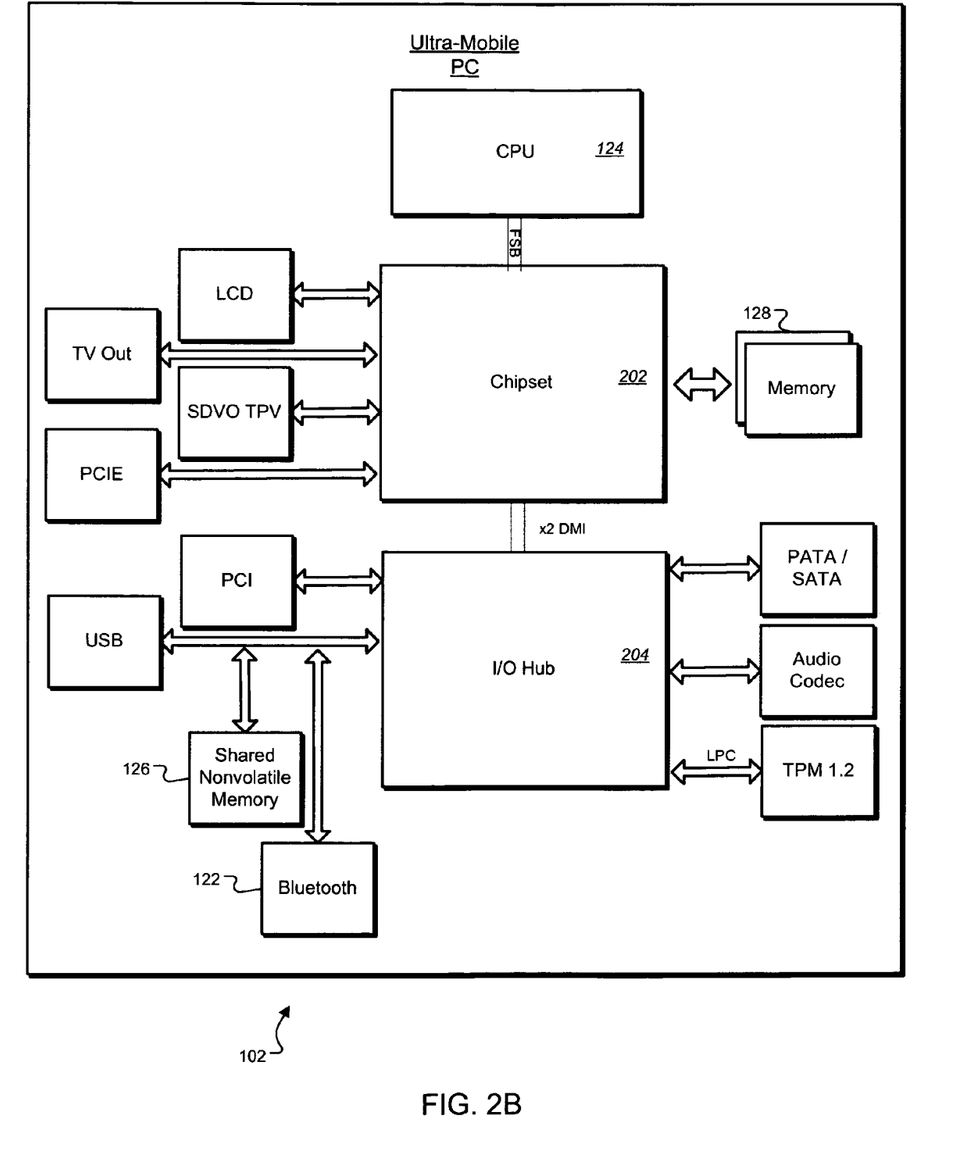
FIG. 2B is a hardware block diagram of an ultra-portable PC device.

FIG. 2B shows a hardware block diagram of an ultra-mobile PC device. In general, a UMPC is a mobile personal computing device has a full computer capability. The depicted device 102 has a CPU 124, which may be single or multiple core processor. A presently preferred embodiment employs an Intel® A100 or A110 processor, designed for low power portable applications. Other processors may, of course, be used. The depicted chipset 202 connects to CPU 124 via the frontside bus. A preferred design is based on low-power Intel® architecture optimized for use in ultra-mobile devices, and provides an Intel® 945GU Express Chipset (202) and Intel® I/O Controller Hub ICH7 for the depicted I/O hub 204.

Chipset 202 contains a memory controller for accessing memory 128, and suitable I/O circuitry for controlling and LCD, a TV Out port, an SDVO port (Serial Digital Video Out), and a PCIE (Peripheral Component Interconnect Express) bus for communication with peripheral devices.

A Direct Media Interface (DMI) bus connects the depicted chipset 202 and I/O hub 204. This interface is preferably a high-speed, bidirectional, point-to-point link supporting a data rate of 1 GB per second in each direction.

I/O hub 204 provides further input/output connectivity such as the parallel or serial ATA data storage interface, the audio Codec for speakers and microphone functionality, and the trusted platform module 1.2 interface supporting secure digital storage. I/O hub 204 further provides a PCI bus interface and a USB (Universal Serial Bus) interface. In one preferred embodiment, the USB connects to shared nonvolatile storage 126, as well as the Bluetooth link 122. The preferred ultra-mobile PC design herein does not provide WLAN or WWAN connectivity aboard module 102 because the wireless connections are provided by wireless module 104.

Figure 3:
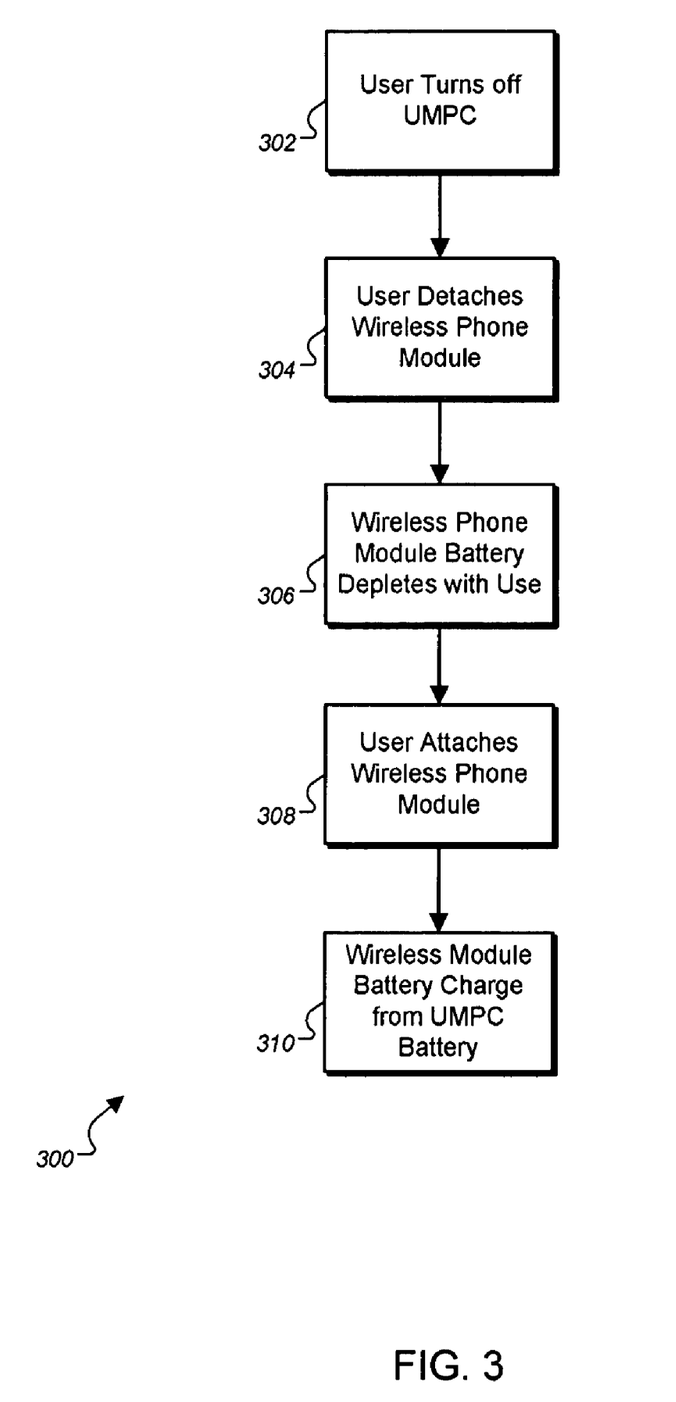
FIG. 3 is a flow chart of a power management scheme according to one embodiment.

FIG. 3 is a flow chart of a power management scheme according to one embodiment. The depicted scheme provides an increased battery life for the wireless module 104, by parasitic charging for the module 104 battery from the UMPC. This can provide more than double normal battery life for wireless module 104 to be used as a phone.

The power management process may be used with the UMPC turned on or off. In the example process shown, the user turns off the UMPC in step 302. The user detaches the wireless module 104 in step 304. The module is then used as a phone until the battery depletes in step 306. The module is attached to the UMPC in step 308, and charges from the UMPC battery through power connection in step 310.

Note that the phone module does not have to be detached to benefit from parasitic charging. In another typical use scenario, the module 104 is attached to UMPC 102 and the user carries the system in this attached state. UMPC 102 is kept in an off state unless needed. Whether UMPC 102 is on or off, the wireless module 104 parasitically charges from the UMPC 102 power system through either the USB power line or the parallel alternate USB power line employed when the USB bus is not powered (UMPC is off).

Figure 4:
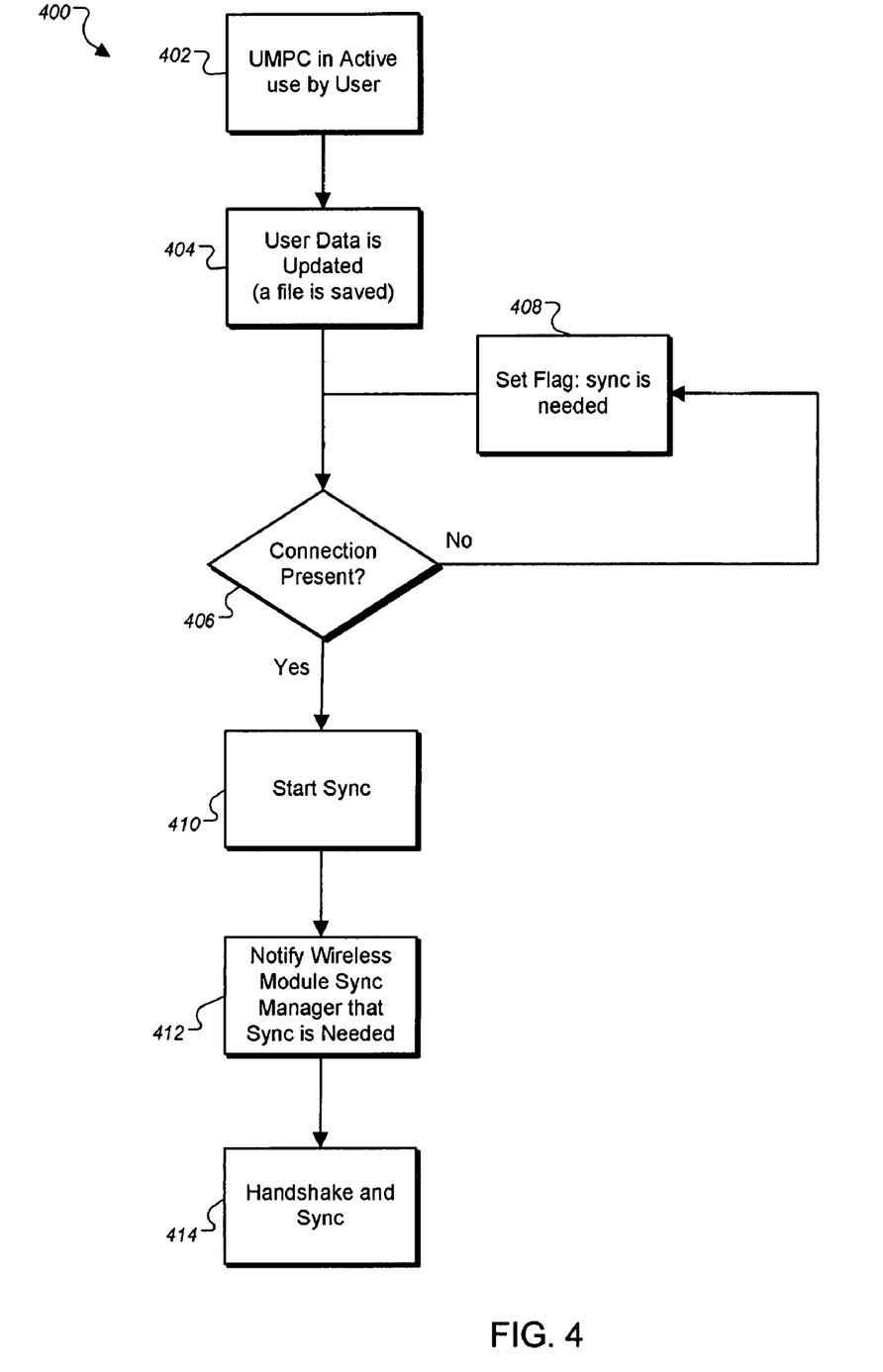
FIG. 4 is a flow chart of a UMPC synchronization process according to one embodiment.

FIG. 4 is a flow chart of a UMPC synchronization process according to one embodiment. User data synchronization is provided in preferred embodiments to keep user data up to date on both devices, as well as to synchronize the UMPC desktop environment data with that of the user's workstation PC over the internet. Preferably, synchronization is ongoing with no command from the user. If the UMPC is powered on, it preferably acts as a Bluetooth host in the synchronization process, with the phone as the client. When the UMPC is powered off, synchronization occurs by module 104 directly accessing UMPC shared storage 126, as described below with respect to FIG. 5. Shared storage 126 may be, for example, a USB-connected flash memory, a serial ATA storage device, or parallel ATA storage device.

The depicted process 400 in FIG. 4 shows an example use scenario with user data synchronization, the steps being initiated on the UMPC. In step 402, the process starts with the UMPC being operated by a user. In step 404, user data is updated. This typically means a data file is saved by the operating system. The data file may be a user file such as a document, draft email, picture, etc. or the data file may be a database employed by an application to save user data.

Step 406 checks to see if a connection is present to the wireless communications module 104. If no connection is present, the process sets a flag or marker in a designated sync-tracking data field that the updated file needs to be synchronized. This is typically a digital flag to signal to other devices that a sync is needed, while the user data changes are tracked in a synchronization task list. The change tracking and flag setting are typically accomplished by a synchronization manager, which may be part of the UMPC operating system or a user application. The process continues to check if a connection is present in step 406. When a connection is found, either a short range wireless (Bluetooth) connection or a direct USB connection, for example, the synchronization starts in step 410.

The synchronization proceeds in step 412 with a UMPC sync manager software module contacting its peer counterpart synchronization manager on the wireless module 104 to notify it that sync is needed. If user data was updated on the module 104 while disconnected, a similar notification may occur in the opposite direction. The devices then handshake, establish a synchronization task list, and exchange data to synchronize. This may be accomplished by synchronization procedures known in the art. A preferred synchronization procedure does not require user input to start or continue the sync process at any point. As in known synchronization procedures, only selected user data may be flagged by the sync manager for syncing when updated by the user.

In some embodiments, the long range wireless connection 106 provides internet connectivity allowing synchronization with a user PC. In such case, the user PC is provided with a synchronization manager associated with that of the UMPC 102 and wireless communications module 104. In such case, the three devices are synchronized. Preferably, the UMPC will carry the complete desktop environment of all user data to make it a true PC companion device. The wireless module 104 may hold only most frequently accessed data files, or recently accessed files, for possible viewing on the phone-sized or PDA-sized viewing area it presents. Synchronization over the long range wireless link 106 may also be accomplished with a designated storage server instead of, or in addition to, a user PC.

Figure 5:
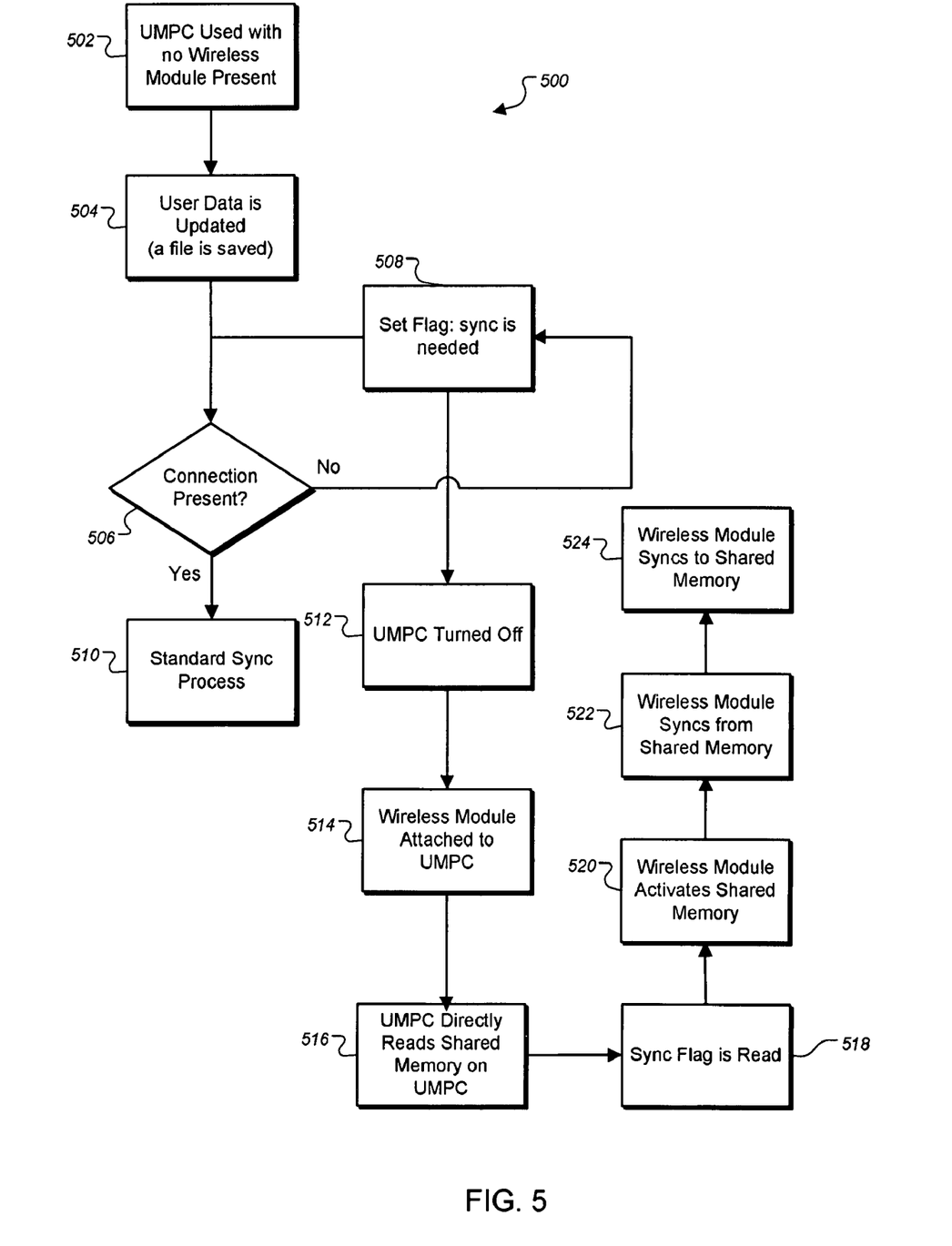
FIG. 5 is another flow chart of a UMPC synchronization process according to one embodiment.

FIG. 5 is a flow chart of a UMPC synchronization process according to another embodiment. User data synchronization is provided in preferred embodiments to keep user data up to date on both devices, as well as to synchronize the UMPC desktop environment data with that of the user's workstation PC over the internet. Preferably, synchronization is ongoing with no command from the user. If the UMPC is powered on, it preferably acts as a Bluetooth host in the synchronization process, with the phone as the client. When the UMPC is powered off, synchronization occurs by module 104 directly accessing UMPC shared storage 126, as shown in the depicted flow chart.

The depicted process 500 in FIG. 5 shows an example use scenario with user data synchronization, the steps being initiated on the wireless communications module. In step 502, the process starts with the UMPC 102 being in an off state and the wireless module 104 being operated by a user. In step 504, user data is updated. This may be data resident on the wireless communications module 104 or data stored on a third device configured to synchronize with module 104 and UMPC 102. For example, the user's home or office PC may be configured to synchronize with these devices over the internet or a home or business network. The update of synchronizable data typically occurs when a data file is saved by the operating system. The data file may be a user file such as a document, draft email, picture, etc. or the data file may be a database employed by an application to save user data.

Step 506 checks to see if a connection is present to the wireless communications module 104. If a connection is present, the synch process is initiated in step 510. If no connection is present, the process sets a flag or marker in a designated sync-tracking data field that the updated file needs to be synchronized. This is typically a digital flag to signal to other devices that a sync is needed, while the user data changes are tracked in a synchronization task list. The change tracking and flag setting are typically accomplished by a synchronization manager, which may be part of the UMPC operating system or a user application.

In this scenario of the synchronization process, UMPC is turned off in step 512. When the wireless communications module 104 is connected in step 514, it is not able to communicate with the UMPC controller via standard means such as Bluetooth or USB connected to the UMPC processor 124, because UMPC 102 is powered off. Wireless module 104 therefore employs a modified circuit (FIG. 6) to directly connect to shared storage and access synchronized data (step 516). The remaining steps will be discussed with reference to the circuit block diagram in FIG. 6 as well as the FIG. 5 flow chart.

Figure 6:
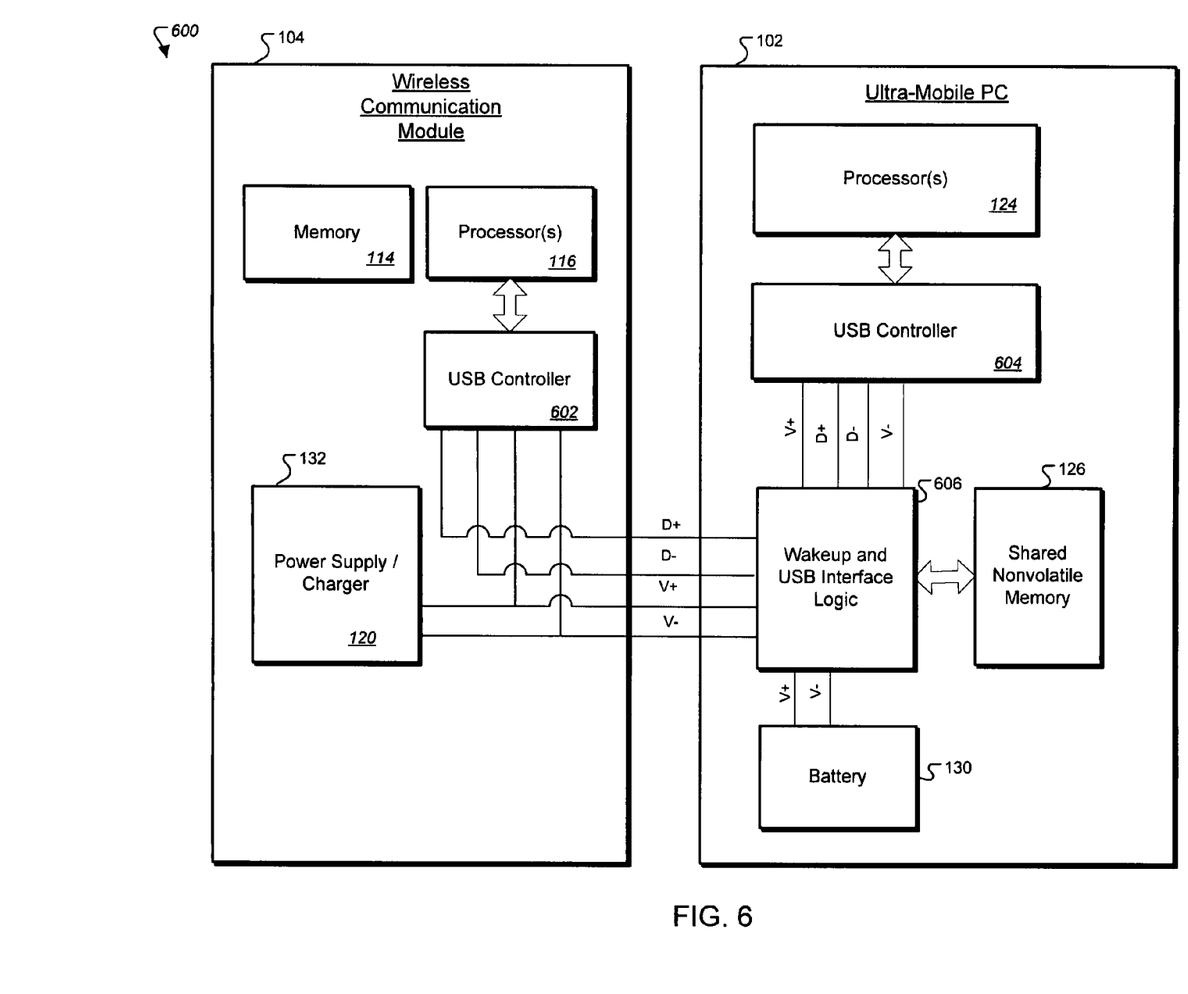
FIG. 6 is a more detailed block diagram of one example circuit for updating shared storage in the UMPC when it is powered off.

In step 518, the wireless module reads sync flag from the wakeup logic 606, to determine if synchronization is needed. (Other embodiments may provide the sync flag(s) in the shared storage, but a wakeup logic scheme is preferred because it avoids powering up the shared storage if no sync is needed.) If a sync is needed, the process proceeds to step 520 where module 104 powers up the shared storage by command through wakeup logic 606. Next, module 104 copies data from the shared storage in step 524. Module 104 also copies data to the shared storage in step 506. The read and write process may occur in various sequences depending on the scheme used and data to be synchronized.

FIG. 6 is a more detailed block diagram of one example circuit for updating shared storage in the UMPC when it is powered off. The Figure shows only relevant portions of the devices. Depicted is UMPC 102 with a shared storage circuit 126. The circuit is accessible by wireless communication module 104 when UMPC 102 is powered off, via the depicted control wakeup and control circuitry 606.

Generally, shared storage 126 may be, for example, a USB-connected flash memory, a serial ATA storage device, or parallel ATA storage device, or other suitable nonvolatile storage device. The depicted preferred embodiment uses a USB flash drive for storage 126. In many UMPC devices, the entire nonvolatile (storage) storage is flash storage, with no hard drive. In such cases, the shared storage access schemes provided herein can operate to wake up a selected portion of the flash, read and write to it, and then turn it off and repeat with another selected portion of the flash. Or, a single selected portion may serve as the synchronized data portion.

In this embodiment, UMPC 102 includes a USB controller 604 coupled to the processor 124 via the system bus interface (not shown). When the UMPC is powered on, the controller accesses shared storage 126 to save user data that has been designated for synchronization. Some synchronization schemes will designate all user data files, or a portion. The designated data depends on the scheme employed as well as whether synchronization is configured only the wireless module 104, or with a remote computer such as a home or work PC.

When active, the UMPC processor 124 communicates over the depicted 4-wire USB bus in this embodiment to the USB interface logic 606 to interface with shared storage 126. Updated data is written to shared storage 126 for synchronization. Whether data is also stored in other system nonvolatile storage depends on the particular syncing scheme employed. For example, one sync manager embodiment may replicate data to be synchronized from the UMPC main nonvolatile storage into the shared storage. In some embodiments all of the UMPC nonvolatile storage may be shared. Some embodiments may keep synchronized data only in the shared storage, and use a shortcut scheme to present the data in the data environment of the UMPC. Other embodiments may use other nonvolatile storage schemes and other data bus schemes, and the invention herein is not limited to a particular logical synchronization scheme.

When the UMPC is powered off, and the wireless communications module 104 is connected (as in the scenario of FIG. 5), module 104 accesses shared storage 126 through wakeup logic 606. Preferably, logic 606 contains a nonvolatile register to hold the synchronization flag(s). In a preferred embodiment, wireless module 104 communicates with wakeup circuitry 606 through a USB connection between the two attached devices. A high strobe or other pre-arranged signal activates the wakeup logic to the presence of module 104. The wakeup logic then powers up the shared storage 126. It may power up all of the storage, or a select portion. Power for this process is supplied from battery 130.

After the shared storage is powered up, wireless module 104 may read and write to it as needed to complete data synchronization in both directions.

In addition to the shared storage access, in this embodiment UMPC battery 130 provides voltage to the module 104 charger through the USB power lines. The wakeup and USB interface logic 606 may also activate a power supply to convert voltage for such connection. Alternatively, the wakeup logic may switch power MOSFETs to make the battery 130 voltage available to module 104 charger 120. In another embodiment, two additional power lines may be provided in the attachment connector to conduct the UMPC battery voltage to charger 120. Any suitable power transfer method may be used to charge wireless module 104 from the UMPC battery when UMPC 102 is powered off.

Figure 7:
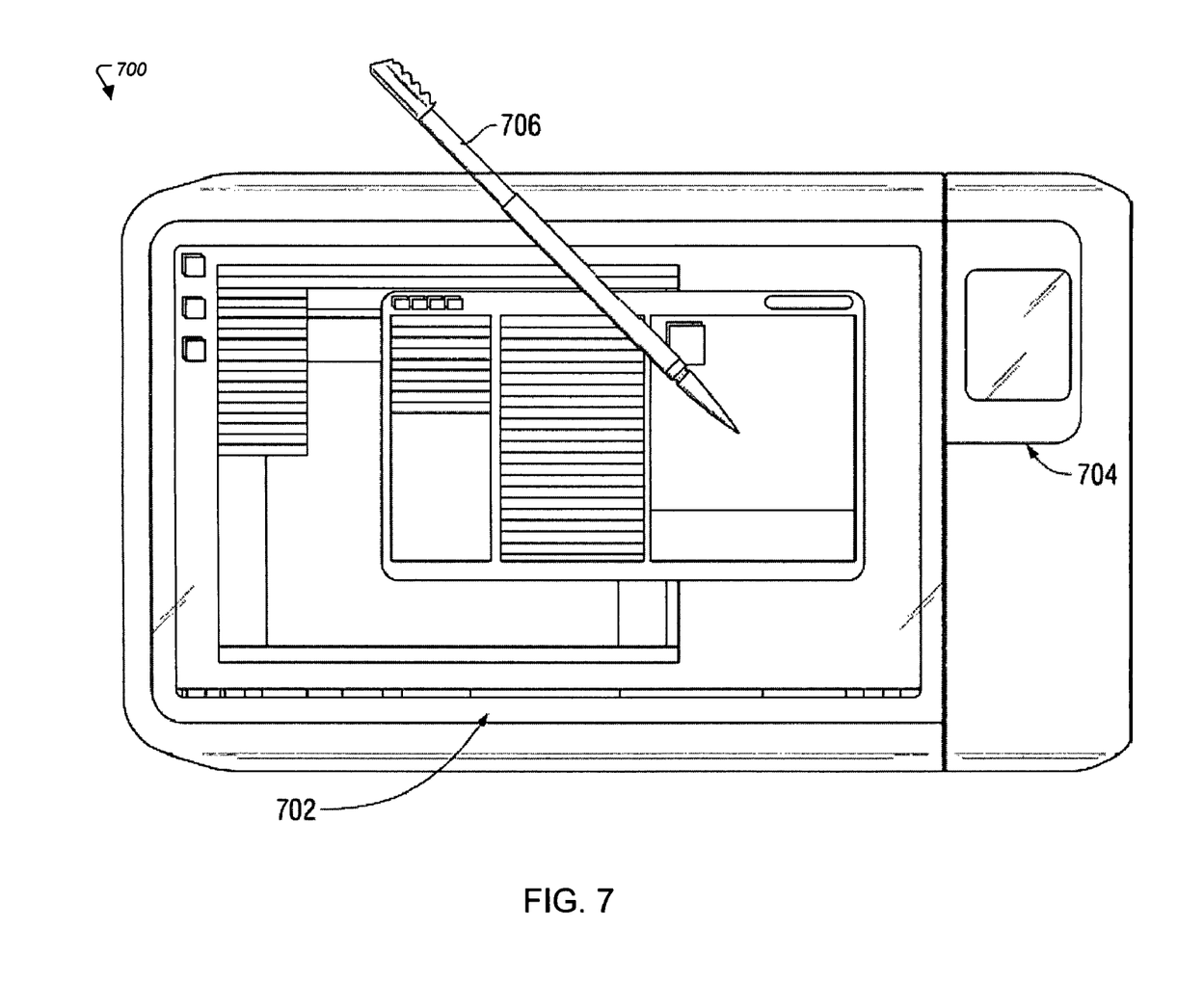
FIG. 7 is perspective view of another mobile computing system with a different form factor.

FIG. 7 is a perspective representing another mobile computing system 700 with an alternate form factor. The depicted system includes UMPC 702 and wireless communication module 704, generally having the functional properties described herein. Module 704 is detachable from UMPC 702. In this form factor, module 704 attached in a breakaway scheme along one edge of UMPC 704, and presents a small screen oriented parallel to UMPC 702 screen. The module 704 screen, when attached, acts as a secondary screen, the systems cooperating to support drag and drop between screens. That is, data may be copied to module 704, and added to a sync list for updates to module 704 by dragging and dropping from the UMPC screen to a designated drop target on the module 704. Data may also be transferred and synchronization relationships set in the opposite direction. Drag and drop may be accomplished with a touchscreen and stylus 706 or through another pointing device such as mousepad or mouse buttons paired with a touch or non-touch screen.

In addition to the synchronized relationship between the two devices, applications may also cooperate between the devices, when attached or when logically tethered through Bluetooth connection. For example, a "Set appointment" command on the phone device may activate a calendar application on the UMPC.

Figure 8:
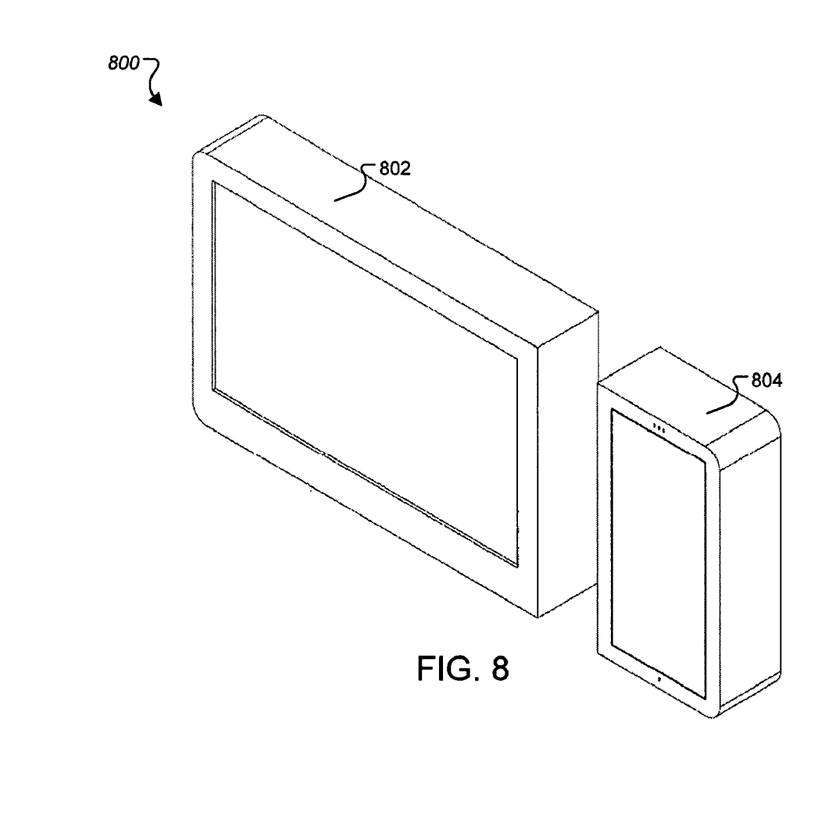
FIG. 8 is perspective view of another mobile computing system with another different form factor.

FIG. 8 is perspective view of another mobile computing system with another different form factor. The depicted system 800 provides wireless communications module 804 with a breakaway detachment connection to UMPC 802.

Figure 9:
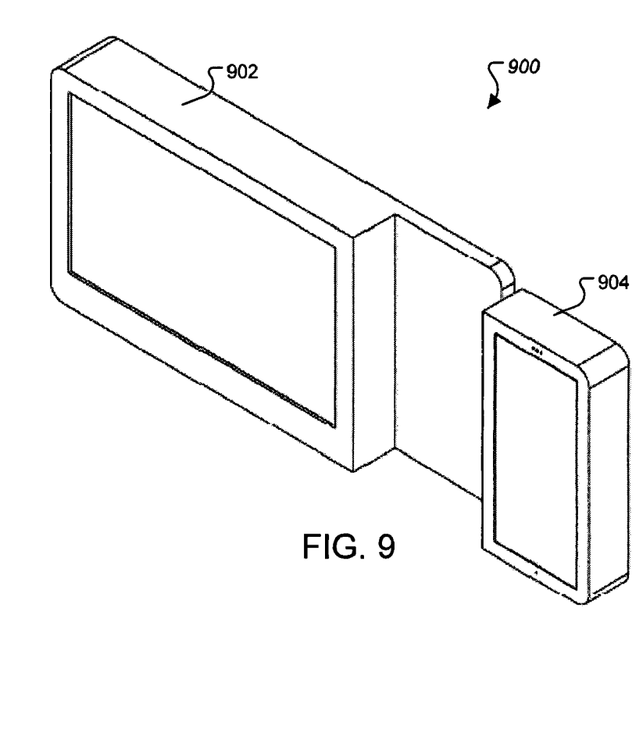
FIG. 9 is perspective view of yet another mobile computing system with a different form factor.

FIG. 9 is perspective view of another mobile computing system with another different form factor. The depicted system 900 provides wireless communications module 904 with slide out to UMPC 902.

A number of embodiments of the invention have been described. Nevertheless, it will be understood that various modifications may be made without departing from the spirit and scope of the invention. For example, various construction materials may be used. Further, other techniques besides the depicted neck and head designs may be employed to do center of gravity shifting. Accordingly, other variations are within the scope of the following claims.

What is claimed is:

1. An mobile computing system comprising:
    a wireless voice and data module having two-way voice communication capability and including an earpiece, microphone, a button keypad or a touchscreen, and a display screen, and a first memory storing first user data;
    a portable computer operable to run user applications and including a second memory storing second user data, the portable computer further including a housing having an opening adapted to receive the wireless voice and data module, the computer adapted to supply power to the wireless voice and data module;
    wherein the wireless voice and data module comprises a short range wireless transceiver and a long range wireless transceiver, the wireless voice and data module containing software instructions for synchronizing the first user data with the second user data with the computer over the short range wireless transceiver;
    wherein the computer comprises a shared- access nonvolatile storage area accessible by the wireless module when the computer is in a powered-off state;
    wherein the computer further comprises a wakeup logic circuit coupled to the nonvolatile storage to and to the power source, the wakeup circuit operable to receive a wakeup signal from the wireless module while the computer is powered-off, and in response to the receiving the wakeup signal, the wakeup circuit being operable to provide read and write access to the nonvolatile storage without powering on the computer.

2. The system of claim 1 wherein the short range wireless transceiver is a Bluetooth transceiver.

3. The system of claim 1 wherein the computer is adapted to supply secondary power to the wireless voice and data module when the computer is powered off.

4. The system of claim 1 wherein the wireless voice and data module is adapted to supply power to the computer.

5. The system of claim 1 wherein the wireless voice and data module further comprises a WLAN transceiver.

6. The system of claim 1 wherein the computer is a UMPC.

7. The system of claim 1 in which the nonvolatile storage holds the second user data.

8. The system of claim 1 wherein the software instructions operable to synchronize the first user data with the second user data in the novolatile storage when the computer is in the powered-off state.

9. The system of claim 1 wherein the long range wireless transceiver is a cellular transceiver.

10. The system of claim 9 further comprising a WLAN transceiver in the wireless voice and data module.

11. The system of claim 1 wherein the long range wireless transceiver is a WLAN transceiver, the wireless voice and data module being adapted to transmit VoIP data over the WLAN transceiver.

12. An mobile computing system comprising:
    a wireless voice and data module including a first memory storing first user data;
    a portable computer adapted to detachably connect to the wireless voice and data module and including a second memory storing second user data;
    wherein the wireless voice and data module comprises a short range wireless transceiver, a long range wireless transceiver, and a data connector adapted to conductively connect to the computer, the wireless voice and data module containing a synchronization manager module adapted to synchronize the first user data with the second user data on the computer; and
    a shared-access nonvolatile storage area accessible by the wireless module when the computer is in a powered-off state;
    wherein the portable computer is further comprises a wakeup logic circuit coupled to the nonvolatile storage to and to the power source, the wakeup circuit operable to receive a wakeup signal from the wireless module while the computer is powered-off, and in response to the receiving the wakeup signal, the wakeup circuit being operable to provide read and write access to the nonvolatile storage without powering on the computer.

13. The system of claim 12 in which the synchronization manager module is further adapted to synchronize data with a third computer device through the long range wireless transceiver.

14. The system of claim 12 wherein the synchronization module is operable to synchronize in a first mode over the short range wireless transceiver or in a second mode over the data connector.

15. The system of claim 14 wherein the synchronization module is operable to synchronize in a third mode over the long range wireless connection.

* * * * *